United States Patent Office 2,792,357
Patented May 14, 1957

2,792,357

PROCESS FOR BREAKING PETROLEUM EMULSIONS EMPLOYING CERTAIN POLYEPOXIDE MODIFIED OXYALKYLATION DERIVATIVES, SAID DERIVATIVES OBTAINED IN TURN BY OXYALKYLATION OF PHENOL - ALDEHYDE RESINS

Melvin De Groote, University City, and Kwan-Ting Shen, Brentwood, Mo., assignors to Petrolite Corporation, Wilmington, Del., a corporation of Delaware No Drawing. Application November 19, 1953, Serial No. 393,224

2 Claims. (Cl. 252—331)

The present application is a continuation-in-part of our co-pending applications, Serial No. 343,804, filed March 20, 1953, and Serial No. 349,972, filed April 20, 1953. The first of said co-pending applications relates to a process for breaking petroleum emulsions of the water-in-oil type employing a demulsifier including the reaction products of (A) certain oxyalkylated phenol-aldehyde resins, therein described in detail, and (B) certain phenolic polyepoxides and cogenerically associated compounds formed in their preparation, also therein described in detail, the ratio of reactant (A) to reactant (B) being in the proportion of 2 moles of (A) to one mole of (B).

The second of the aforementioned co-pending applications is comparable to the above application, Serial No. 343,804, except that the polyepoxide employed is a non-aryl hydrophile polyepoxide which is therein described in detail.

Note that in both patent applications the molal ratio of oxyalkylated resin to polyepoxide is 2 to 1.

In our 2 co-pending applications, Serial Nos. 393,221 and 393,223, the same situation applies except that the molar ratio is 4 to 3 instead of 2 to 1. Co-pending application, Serial No. 393,221 employs the same type of polyepoxide as in Serial No. 343,804. Likewise, co-pending application, Serial No. 393,223 employs the same type of epoxide as co-pending application, Serial No. 349,972.

In the present application the molal ratio again is 4 to 3 and not 2 to 1 and involves both types of polyepoxides. Stated another way, the hydrophile polyepoxide described in Serial No. 349,972 is employed first in a 2 to 1 ratio, and then 2 moles of this larger molecule are united by one mole of the hydrophobe polyepoxide described in Serial No. 343,804. Thus, it is obvious that the present application employs the products described in Serial No. 349,972 as an intermediate. For this reason much of the text is identical with that found in Serial No. 349,972, but that part of the text which describes the hydrophile polyepoxide in Serial No. 343,804 also appears in the present description.

Thus the present invention relates to a process for breaking petroleum emulsions of the water-in-oil type employing a demulsifier including the reaction products of (A) certain oxyalkylated phenol-aldehyde resins, hereinafter described in detail, and (B) certain non-aryl hydrophile polyepoxides, hereinafter described in detail, further reacted with (C) certain phenolic polyepoxides and cogenerically associated compounds formed in their preparation, also hereinafter described in detail. The reactants (A) and (B) are reacted in the molar proportion of 2:1 respectively to form an intermediate (ABA) and this intermediate is reacted with (C) in the molar proportion of 2:1 respectively to produce the final reaction product (ABACABA).

As has been pointed out in our aforementioned co-pending application, Serial Number 337,884, filed February 19, 1953, there are two types of polyepoxides, particularly diepoxides, one being, for example characterized by the formula:

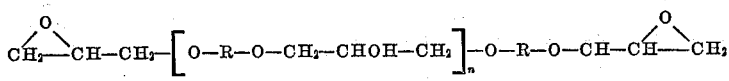

wherein R represents the divalent hydrocarbon radical of a dihydric phenol and $n$ is an integer of the series of 0, 1, 2, 3, etc. More specifically, such diglycidyl ethers may be illustrated by the following formula:

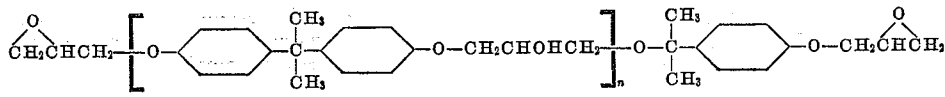

wherein $n$ is an integer of the series 0, 1, 2, 3, etc.

In contradistinction to such diglycidyl ethers which introduce an essentially hydrophobe radical or radicals, the present invention is characterized by analogous compounds derived from diglycidyl ethers which do not introduce any hydrophobe properties in its usual meaning but in fact are more apt to introduce hydrophile properties.

Thus, in the instance invention the initial use of a polyepoxide and particularly a diglycidyl ether involves the use of one which introduces hydrophile character. Thus, the first stage involves a hydrophile polyepoxide. Stated another way, the intermediate is the result of a reaction involving such hydrophile epoxide. Thus, the diepoxides employed in the present invention as first-stage reactants are characterized by the fact that the divalent radical connecting the terminal epoxide radicals contains less than 5 carbon atoms in an interrupted chain. For instance, a simple member and one of the most readily available members of the class of diepoxides described in our co-pending application, Serial No. 324,814, filed December 8, 1952, is

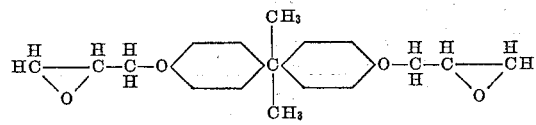

It is to be noted in this formula the terminal epoxy radicals are separated by the divalent hydrophobe group

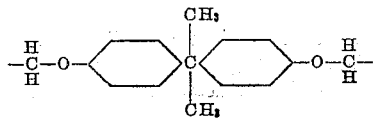

The diepoxides employed as first-stage reactants in the present process are obtained from glycols such as ethylene glycol, diethylene glycol, propylene glycol, dipropylene glycol, tripropylene glycol, butylene glycol, dibutylene glycol, tributylene glycol, glycerol, diglycerol, triglycerol, and similar compounds. Such products are well known and are characterized by the fact that there are not more than 4 uninterrupted carbon atoms in any group which is part of the radical joining the epoxide groups. Of necessity such diepoxides must be non-aryl or aliphatic in character. The diglycidyl ethers of our copending application, Serial No. 324,814, filed December 8, 1952, are invariably and inevitably aryl in character.

The diepoxides employed as first-stage reactants in the present process are usually obtained by reacting a glycol or equivalent compound, such as glycerol or diglycerol with epicholorohydrin and subsequently with an alkali. Such diepoxides have been described in the literature and particularly the patent literature. See, for example, Italian Patent 400,973, dated August 8, 1951; see, also, British Patent 518,057, dated December 10, 1938; and U. S. Patent No. 2,070,990, dated February 16, 1937 to Groll et al. Reference is made also to U. S. Patent No. 2,581,464, dated January 8, 1952, to Zech. This particular last mentioned patent describes a composition of the following general formula:

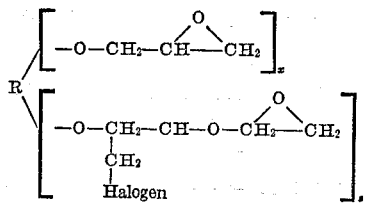

in which $x$ is at least 1, $z$ varies from less than 1 to more than 1, and $x$ and $z$ together are at least 2 and not more than 6, and R is the residue of the polyhydric alcohol remaining after replacement of at least 2 of the hydroxyl groups thereof with the epoxide ether groups of the above formula, and any remaining groups of the residue being free hydroxyl groups.

It is obvious from what is said in the patent that variance can be obtained in which the halogen is replaced by a hydroxyl radical; thus the formula would become

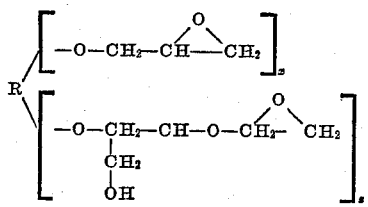

Reference to being thermoplastic characterizes them as being liquids at ordinary temperature or readily convertible to liquids by merely heating below the point of pyrolysis and thus differentiates them from infusible resins. Reference to being soluble in an organic solvent means any of the usual organic solvents such as alcohols, ketones, esters, ethers, mixed solvents, etc. Reference to solubility is merely to differentiate from a reactant which is not soluble and might be not only insoluble but also infusible. Furthermore, solubility is a factor insofar that it is sometimes desirable to dilute the compound containing the epoxy rings before reacting with a resin as described. In such instances, of course, the solvent selected would have to be one which is not susceptible to oxyalkylation, as, for example, kerosene, benzene, toluene dioxane, various ketones, chlorinated solvents, dibutyl ether, dihexyl ether, ethyleneglycol diethylether, diethyleneglycol diethylether, and dimethoxytetraethyleneglycol.

The expression "epoxy" is not usually limited to the 1,2-epoxy ring. The 1,2-epoxy ring is sometimes referred to as the oxirane ring to distinguish it from other epoxy rings. Hereinafter the word "epoxy" unless indicated otherwise, will be used to mean the oxirane ring i. e., the 1,2-epoxy ring. Furthermore, where a compound has two or more oxirane rings they will be referred to as polyepoxides.. They usually represent, of course, 1,2-epoxide rings or oxirane rings in the alpha-omega position. This is a departure, of course, from the standpoint of a strictly formal nomenclature as in the example of the simplest diepoxide which contains at least 4 carbon atoms and is formally described as 1,2-epoxy-3,4-epoxybutane (1,2,3,4 diepoxybutane).

It well may be that even though the previously suggested formula represents the principal component, or components, of the resultant or reaction product described in the previous text, it may be important to note that somewhat similar compounds, generally of much higher molecular weight, have been described as complex resinous epoxides which are polyether derivatives of polyhydric phenols containing an average of more than one epoxide group per molecule and free from functional groups other than epoxide and hydroxyl groups. See U. S. Patent No. 2,494,295, dated January 10, 1950, to Greenlee. The compounds here included are limited to the monomers or the low molal members of such series and generally contain two epoxide rings per molecule and may be entirely free from a hydroxyl group. This is important because the instant invention is directed toward products which are not insoluble resins and have certain solubility characteristics not inherent in the usual thermosetting resins. Note, for example, that said U. S. Patent No. 2,494,295 describes products wherein the epoxide derivative can combine with a sulfonamide resin. The intention in said U. S. Patent 2,494,295, of course, is to obtain ultimately a suitable resinous product having the characteristics of a comparatively insoluble resin. Simply for purpose of illustration to show a typical diglycidyl ether of the kind herein employed, reference is made to the following formula:

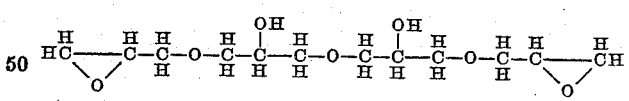

or if derived from cyclic diglycerol the structure would be thus:

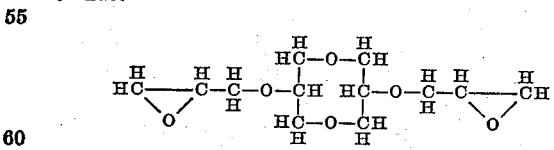

or the equivalent compound wherein the ring structure involves only six atoms thus:

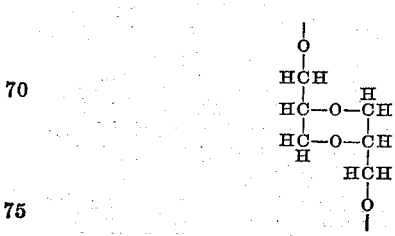

Commercially available compounds seem to be largely to the former with comparatively small amounts, in fact comparatively minor amounts, of the latter.

Having obtained a reactant having generally 2 epoxy rings as depicted in the next to last formula preceding, or low molal polymers thereof, it becomes obvious the reaction can take place with any oxyalkylated phenol-aldehyde resin by virtue of the fact that there are always present either phenolic hydroxyls or their alkanol radicals or the equivalent or alkanol radicals in the presence of any phenolic hydroxyl. Indeed, the products obtained by oxyalkylation of the phenolic resins must invariably and inevitably be oxyalkylation-susceptible.

To illustrate the products useful in the process of the present invention, reference will be made to a reaction involving a mole of the oxyalkylating agent, i. e., the compound having two oxirane rings and an oxyalkylated resin. Proceeding with the example previously described, it is obvious the reaction ratio of two moles of the oxyalkylated resin to one mole of the oxyalkylating agent gives a product which may be indicated as follows:

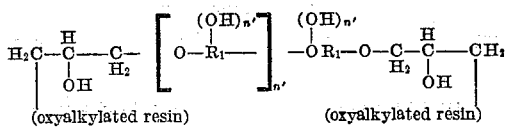

in which $n'$ is a small whole number less than 10, and usually less than 4, and including 0, and $R_1$ represents a divalent radical as previously described being free from any radical having more than 4 uninterrupted carbon atoms in a single chain, and the characterization "oxyalkylated resin" is simply an abbreviation for the oxyalkylated resin which is described in greater detail subsequently.

Such products must be soluble in suitable solvents such as a non-oxygenated hydrocarbon solvent or an oxygenated hydrocarbon solvent or, for that matter, a mixture of the same with water. Needless to say, after the resin has been treated with a large amount of ethylene oxide, the products are water soluble and may be soluble in an acid solution.

The purpose in this instance is to differentiate from insoluble resinous materials, particularly those resulting from relation or cross-linking. Not only does this property serve to differentiate from instances where an insoluble material is desired, but also serves to emphasize the fact that in many instances the preferred compounds have distinct water-solubility or are distinctly soluble in 5% acetic acid. For instance, the products freed from any solvent can be shaken with five to twenty times their weight of distilled water at ordinary temperature and are at least self-dispersing, and in many instances water-soluble, in fact, colloidally soluble.

Basic nitrogen atoms can be introduced into such derivatives by use of a reactant having both a nitrogen group and a 1,2-epoxy group, such as 3-dialkylamino-epoxypropane. See U. S. Patent No. 2,520,093, dated August 22, 1950, to Gross.

For purpose of convenience, what is said hereinafter will be divided into nine parts, with Part 7, in turn, being divided into three subdivisions.

Part 1 is concerned with the hydrophile type of polyepoxide and particularly the hydrophile type of diepoxide reactant, i. e., the one that enters into the formation of the intermediate ABA.

Part 2 is concerned with suitable phenol-aldehyde resins to be employed for reaction with the epoxides.

Part 3 is concerned with the oxyalkylation of the previously described phenol-aldehyde resins.

Part 4 is concerned with the procedure involving the preparation of an intermediate by reaction between two moles of the oxyalkylated phenol-aldehyde resin and one mole of the diglycidyl ether, for example (identical with the products described in aforementioned co-pending application, Serial No. 349,972) followed by a second step in which 2 moles of these larger molecules are combined with a single mole of the diglycidyl ether or the like. This intermediate has been described previously as ABA.

Part 5 is concerned with our preference in regard to the hydrophobe type of polyepoxide and particularly the diepoxide reactant.

Part 6 is concerned with certain theoretical aspects of preparing the hydrophobe type of diepoxide.

Part 7, Subdivision A, is concerned with the preparation of monomeric hydrophobe diepoxides and includes Table VIII.

Part 7, Subdivision B, is concerned with the low molal hydrophobe type of polymeric epoxides or mixtures containing low molal polymeric epoxides as well as the hydrophobe monomer and includes Table IX.

Part 7, Subdivision C, is concerned with miscellaneous phenolic reactants suitable for the preparation of hydrophobe diepoxides.

Part 8 is concerned with reactions involving said intermediate ABA above described and hydrophobe polyepoxides and particularly diepoxide (C) to yield the final product indicated as ABACABA.

Part 9 is concerned with the resolution of petroleum emulsions of the water-in-oil type by means of the previously described chemical compounds or reaction products.

PART 1

Reference is made to previous patents as illustrated in the manufacture of the non-aryl polyepoxides and particularly diepoxides employed as reactants in the instant invention. More specifically, such patents are the following: Italian Patent No. 400,973, dated August 8, 1941; British Patent No. 518,057, dated December 10, 1938; U. S. Patent No. 2,070,990, dated February 16, 1937, to Groll et al.; and U. S. Patent No. 2,581,464, dated January 8, 1952, to Zech. The simplest diepoxide is probably the one derived from 1,3-butadiene or isoprene. Such derivatives are obtained by the use of peroxides or by other suitable means and the diglycidyl ethers may be indicated thus:

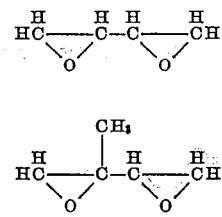

In some instances the compounds are essentially derivatives of etherized epichlorohydrin or methyl epichlorohydrin. Needless to say, such compounds can be derived from glycerol monochlorohydrin by etherization prior to ring closure. An example is illustrated in the previously mentioned Italian Patent No. 400,973:

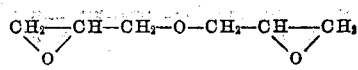

Another type of diepoxide is diisobutenyl dioxide as described in aforementioned U. S. Patent No. 2,070,990, dated February 16, 1937, to Groll, and is of the following formula:

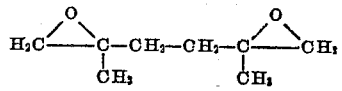

The diepoxides previously described may be indicated by the following formula:

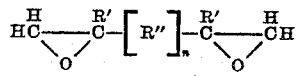

in which R' represents a hydrogen atom or methyl radical and R'' represents the divalent radical uniting the two terminal epoxide groups, and $n'$ is the numeral 0 or 1. As previously pointed out, in the case of the butadiene derivative, $n'$ is 0. In the case of diisobutenyl dioxide R'' is $CH_2CH_2$ and $n'$ is 1. In another example previously referred to R'' is $CH_2OCH_2$ and $n'$ is 1.

However, for practical purposes the only diepoxide available in quantities other than laboratory quantities is a derivative of glycerol or epichlorohydrin. This particular diepoxide is obtained from diglycerol which is largely acyclic diglycerol, and epichlorohydrin or equivalent thereof, in that the epichlorohydrin itself may supply the glycerol or diglycerol radical in addition to the epoxy rings. As has been suggested previously, instead of starting with glycerol or a glycerol derivative, one could start with any one of a number of glycols or polyglycols and it is more convenient to include as part of the terminal oxirane ring radical the oxygen atom that was derived from epichlorohydrin or, as might be the case, methyl epichlorohydrin. So presented, the formula becomes:

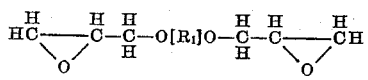

In the above formula $R_1$ is selected from groups such as the following:

$C_2H_4$
$C_2H_4OC_2H_4$
$C_2H_4OC_2H_4OC_2H_4$
$C_3H_6$
$C_3H_6OC_3H_6$
$C_3H_6OC_3H_6OC_3H_6$
$C_4H_8$
$C_4H_8OC_4H_8$
$C_4H_8OC_4H_8OC_4H_8$
$C_3H_5(OH)$
$C_3H_5(OH)OC_3H_5(OH)$
$C_3H_5(OH)OC_3H_5(OH)OC_3H_5(OH)$

It is to be noted that in the above epoxides there is a complete absence of (a) aryl radicals and (b) radicals in which 5 or more carbon atoms are united in a single uninterrupted single group. $R_1$ is inherently hydrophile in character as indicated by the fact that it is specified that the precursory diol or polyol HOROH must be water-soluble in substantially all proportions, i. e., water miscible.

Stated another way, what is said previously means that a polyepoxide such as

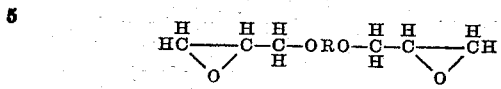

is derived actually or theoretically, or at least derivable, from the diol HOROH, in which the oxygen-linked hydrogen atoms were replaced by

Thus, $R(OH)_n$, where $n$ represents a small whole number which is 2 or more, must be water-soluble. Such limitation excludes polyepoxides if actually derived, or theoretically derived at least, from water-insoluble diols or water-insoluble diols or water-insoluble triols or higher polyols. Suitable polyols may contain as many as 12 to 20 carbon atoms or thereabouts.

Referring to a compound of the type above in the formula

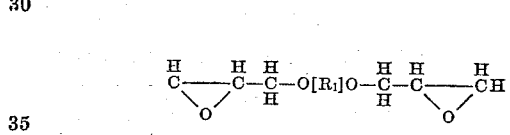

in which $R_1$ is $C_3H_5(OH)$, it is obvious that reaction with another mole of epichlorohydrin with appropriate ring closure would produce a triepoxide or, similarly, if R happened to be $C_3H_5(OH)OC_3H_5(OH)$, one could obtain a tetraepoxide. Actually, such procedure generally yields triepoxides, or mixtures with higher epoxides and perhaps in other instances mixtures in which diepoxides are also present. Our preference is to use the diepoxides.

There is available commercially at least one diglycidyl ether free from aryl groups and also free from any radical having 5 or more carbon atoms in an uninterrupted chain. This particular diglycidyl ether is obtained by the use of epichlorohydrin in such a manner that approximately 4 moles of epichlorohydrin yield one mole of the diglycidyl ether, or, stated another way, it can be considered as being formed from one mole of diglycerol and 2 moles of epichlorohydrin so as to give the appropriate diepoxide. The molecular weight is approximately 370 and the number of epoxide groups per molecule are approximately 2. For this reason in the first of a series of subsequent examples this particular diglycidyl ether is used, although obviously any of the others previously described would be just as suitable. For convenience, this diepoxide will be referred to as diglycidyl ether A. Such material corresponds in a general way to the previous formula.

Using laboratory procedure we have reacted diethyleneglycol with epichlorohydrin and subsequently with alkali so as to produce a product which, on examination, corresponded approximately to the following compound:

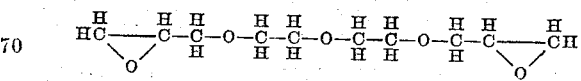

The molecular weight of the product was assumed to be 230 and the product was available in laboratory quantities only. For this reason, the subsequent table referring to the use of this particular diepoxide, which will be referred to as diglycidyl ether B, is in grams instead of pounds.

Probably the simplest terminology for these polyepoxides, and particularly diepoxides, to differentiate from comparable aryl compounds, is to use the terminology "epoxyalkanes" and, more particularly, polyepoxyalkanes or diepoxyalkanes. The difficulty is that the majority of these compounds represent types in which a carbon atom chain is interrupted by an oxygen atom and, thus, they are not strictly alkane derivatives. Furthermore, they may be hydroxylated or represent a heterocyclic ring. The principal class properly may be referred to as polyepoxypolyglycerols, or diepoxypolyglycerols.

Other examples of diepoxides involving a heterocyclic ring having, for example, 3 carbon atoms and 2 oxygen atoms, are obtainable by the conventional reaction of combining erythritol with a carbonyl compound, such as formaldehyde or acetone so as to form the 5-membered ring, followed by conversion of the terminal hydroxyl groups into epoxy radicals.

See also Canadian Patent No. 672, 935.

PART 2

This part is concerned with the preparation of phenolaldehyde resins of the kind described in detail in U. S. Patent No. 2,499,370, dated March 7, 1950, to De Groote and Keiser, with the following qualifications: said aforementioned patent is limited to resins obtained from difunctional phenols having 4 to 12 carbon atoms in the substituent hydrocarbon radical. For the present purpose the substituent may have as many as 18 carbon atoms, as in the case of resins prepared from tetradecylphenol, substantially para-tetradecylphenol, commercially available.. Similarly, resins can be prepared from hexadecylphenol or octadecylphenol. This feature will be referred to subsequently.

In addition to U. S. Patent No. 2,499,370, reference is made also to the following U. S. patents: Nos. 2,499,365; 2,499,366; and 2,499,367, all dated March 7, 1950, to De Groote and Keiser. These patents, along with the other two previously mentioned patents, describe phenolic resins of the kind herein employed as initial materials.

For practical purposes, the resins having 4 to 12 carbon atoms are most satisfactory, with the additional $C_{14}$ carbon atom also being very satisfactory. The increased cost of the $C_{16}$ and $C_{18}$ carbon atom phenol renders these raw materials of less importance, at least at the present time.

Patent 2,499,370 describes in detail methods of preparing resins useful as intermediates for preparing the products of the present application, and reference is made to that patent for such detailed description and to Examples 1a through 103a of that patent for examples of suitable resins.

As previously noted, the hydrocarbon substituent in the phenol may have as many as 18 carbon atoms, as illustrated by tetradecylphenol, hexadecylphenol and octadecylphenol, reference in each instance being to the difunctional phenol, such as the ortho- or para-substituted phenol or a mixture of the same. Such resins are described also in issued patents, for instance, U. S. Patent No. 2,499,365, dated March 7, 1950, to De Groote and Keiser, such as Example 71a.

It is sometimes desirable to present the resins herein employed in an over-simplified form which has appeared from time to time in the literature, and particularly in the patent literature, for instance, it has been stated that the composition is approximated in an idealized form by the formula

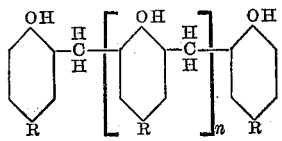

in the above formula $n$ represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., $n$ varies from 1 to 4; R represents an aliphatic hydrocarbon substituent, generally an alkyl radical having from 4 to 14 carbon atoms, such as butyl, amyl, hexyl, decyl or dodecyl radical. Where the divalent bridge radical is shown as being derived from formaldehyde, it may, of course, be derived from any other reactive aldehyde having 8 carbon atoms or less.

In the above formula the aldehyde employed in the resin manufacture is formaldehyde. Actually, some other aldehyde such as acetaldehyde, propionaldehyde, or butyraldehyde may be used. The resin unit can be exemplified thus:

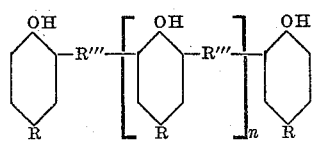

in which $R'''$ is the divalent radical obtained from the particular aldehyde employed to form the resin.

As previously stated, the preparation of resins, the kind herein employed as reactants, is well known. See U. S. Patent No. 2,499,368, dated March 7, 1950, to De Groote and Keiser. Resins can be made using an acid catalyst or basic catalyst or a catalyst showing neither acid nor basic properties in the ordinary sense or without any catalyst at all. It is preferable that the resins employed be substantially neutral, in other words, if prepared by using a strong acid as a catalyst. Such strong acid should be neutralized. Similarly, if a strong base is used as a catalyst it is preferable that the base be neutralized although we have found that sometimes the reaction described proceeded more rapidly in the presence of a small amount of a free base. The amount may be as small as a 200th of a percent and as much as a few 100th of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5; 4.5; or 5.2.

In the actual manufacture of the resins we found no reason for using other than those which are lowest in price and most readily available commercially. For purpose of convenience suitable resins are characterized in the following table:

TABLE I

| Example number | R | Position of R | R''' derived from | $n$ | Mol. wt. of resin molecule (based on $n+2$) |
|---|---|---|---|---|---|
| 1a | Phenyl | Para | Formaldehyde | 3.5 | 992.5 |
| 2a | Tertiary butyl | do | do | 3.5 | 882.5 |
| 3a | Secondary butyl | Ortho | do | 3.5 | 882.5 |
| 4a | Cyclo-hexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |
| 28a | Tertiary amyl | do | do | 1.5 | 604.0 |
| 29a | Cyclo-hexyl | do | do | 1.5 | 646.0 |
| 30a | Hexyl | do | do | 1.5 | 653.0 |
| 31a | do | do | Acetaldehyde | 1.5 | 688.0 |
| 32a | Octyl | do | do | 1.5 | 786.0 |
| 33a | Nonyl | do | do | 1.5 | 835.0 |
| 34a | Octyl | do | Butyraldehyde | 2.0 | 986.0 |
| 35a | Nonyl | do | do | 2.0 | 1,028.0 |
| 36a | Amyl | do | do | 2.0 | 860.0 |
| 37a | Butyl | do | Formaldehyde | 2.0 | 636.0 |
| 38a | Amyl | do | do | 2.0 | 692.0 |
| 39a | Hexyl | do | do | 2.0 | 748.0 |
| 40a | Cyclo-hexyl | do | do | 2.0 | 740.0 |

PART 3

There have been issued a substantial number of patents which give detailed description of the preparation of oxyalkylated derivatives of resins of the kind previously described. For example, see U. S. Patents 2,499,365; 2,499,366; 2,499,367; 2,499,368; and 2,499,370, all dated March 7, 1950, to De Groote and Keiser.

More specifically, a number of other patents have appeared in which the oxyethylation step is given with considerable detail. See, for example, U. S. Patents 2,581,376; 2,581,377; 2,581,378; 2,581,379; 2,581,380; and 2,581,381, all dated January 8, 1952, to De Groote and Keiser. As to further examples, see U. S. Patent 2,602,052, dated July 1, 1952, to De Groote.

The oxypropylation or, for that matter, the treatment of resins with butylene oxide, glycide, or methyl glycide, has been described in the first of the series in the above mentioned patents, i. e., those issued in 1950.

Reference is made to U. S. Patent 2,557,081, dated June 19, 1951, to De Groote and Keiser. This particular patent describes in considerable detail resins which are first treated with propylene oxide and then with ethylene oxide or with ethylene oxide and then propylene oxide or with both oxides simultaneously.

In order to avoid an extensive repetition of what is already described in detail in the patent literature, we are referring to the tables beginning in column 21 of U. S. Patent 2,581,376 and extending through column 36. We have simply numbered these products beginning with 1b, allotting, of course, five numbers to each table beginning with the first table. For convenience these sixteen tables are summarized in the following table:

TABLE II

| Ex. No. | Phenol | Aldehyde | Solvent, lbs. | Resin, lbs. | Ethylene oxide, lbs. |
|---|---|---|---|---|---|
| 1b | Para-tertiary amyl | Formaldehyde | 14.25 | 15.75 | 4.00 |
| 2b | do | do | 10.90 | 12.10 | 15.25 |
| 3b | do | do | 7.13 | 7.93 | 19.69 |
| 4b | do | do | 3.84 | 4.25 | 16.15 |
| 5b | do | do | 1.80 | 2.04 | 10.20 |
| 6b | Nonyl | do | 15.00 | 15.00 | 3.00 |
| 7b | do | do | 10.00 | 10.00 | 9.40 |
| 8b | do | do | 7.27 | 7.27 | 13.70 |
| 9b | do | do | 3.15 | 3.15 | 8.95 |
| 10b | do | do | 2.10 | 2.10 | 8.00 |
| 11b | Para-octyl | do | 14.20 | 15.80 | 3.25 |
| 12b | do | do | 11.10 | 12.40 | 12.50 |
| 13b | do | do | 6.64 | 7.36 | 15.00 |
| 14b | do | do | 4.40 | 4.90 | 14.80 |
| 15b | do | do | 4.10 | 4.58 | 18.52 |
| 16b | Menthyl | do | 13.65 | 16.35 | 3.00 |
| 17b | do | do | 10.00 | 12.00 | 10.75 |
| 18b | do | do | 5.48 | 6.58 | 10.85 |
| 19b | do | do | 4.10 | 4.90 | 13.15 |
| 20b | do | do | 3.10 | 3.72 | 13.43 |
| 21b | Para-secondary butyl | do | 14.45 | 15.55 | 4.25 |
| 22b | do | do | 8.48 | 9.17 | 16.00 |
| 23b | do | do | 4.82 | 5.18 | 14.25 |
| 24b | do | do | 3.85 | 4.15 | 17.00 |
| 25b | do | do | 2.65 | 2.85 | 15.45 |
| 26b | Menthyl | Propionaldehyde | 12.80 | 17.20 | 2.75 |
| 27b | do | do | 8.53 | 11.50 | 9.30 |
| 28b | do | do | 3.77 | 5.08 | 13.10 |
| 29b | do | do | 5.20 | 7.00 | 17.00 |
| 30b | do | do | 2.10 | 2.83 | 9.12 |
| 31b | Para-tertiary amyl | Furfural | 11.20 | 18.00 | 3.50 |
| 32b | do | do | 8.45 | 13.60 | 12.65 |
| 33b | do | do | 4.50 | 8.00 | 14.50 |
| 34b | do | do | 3.42 | 5.48 | 15.10 |
| 35b | do | do | 2.05 | 3.65 | 13.35 |
| 36b | Menthyl | do | 10.25 | 17.75 | 2.50 |
| 37b | do | do | 7.60 | 13.15 | 9.35 |
| 38b | do | do | 4.22 | 6.98 | 10.00 |
| 39b | do | do | 3.76 | 6.24 | 13.25 |
| 40b | do | do | 2.40 | 4.15 | 11.70 |
| 41b | Para-octyl | do | 12.10 | 18.60 | 3.00 |
| 42b | do | do | 9.25 | 14.25 | 11.00 |
| 43b | do | do | 6.72 | 10.32 | 14.91 |
| 44b | do | do | 5.52 | 8.52 | 19.81 |
| 45b | do | do | 1.75 | 2.70 | 8.40 |
| 46b | Para-phenyl | do | 13.90 | 16.70 | 3.00 |
| 47b | do | do | 10.35 | 12.45 | 12.20 |
| 48b | do | do | 8.90 | 10.70 | 19.09 |
| 49b | do | do | 5.20 | 6.26 | 16.04 |
| 50b | do | do | 3.69 | 4.32 | 15.68 |
| 51b | Para-secondary nonyl | do | 10.85 | 20.75 | 3.00 |
| 52b | do | do | 8.28 | 15.85 | 11.77 |
| 53b | do | do | 5.95 | 11.25 | 16.75 |
| 54b | do | do | 4.46 | 8.52 | 19.07 |
| 55b | do | do | 2.57 | 4.93 | 14.50 |
| 56b | | | | | |
| 57b | Para-phenyl | Formaldehyde | 11.00 | 9.00 | 11.75 |
| 58b | | | | | |
| 59b | | | | | |
| 60b | Para-phenyl | Furfural | 3.41 | 2.80 | 13.64 |
| 61b | Para-secondary butyl | Furfural | 12.00 | 17.90 | 3.50 |
| 62b | do | do | 9.35 | 13.92 | 13.23 |
| 63b | do | do | 6.25 | 8.95 | 17.00 |
| 64b | do | do | 4.35 | 6.50 | 18.40 |
| 65b | do | do | 3.02 | 4.34 | 16.49 |
| 66b | Para-octyl | Propionaldehyde | 13.30 | 16.90 | 3.00 |
| 67b | do | do | 10.20 | 12.90 | 11.30 |
| 68b | do | do | 6.46 | 8.24 | 16.50 |
| 69b | do | do | 3.86 | 4.87 | 13.02 |
| 70b | do | do | 2.94 | 3.75 | 13.26 |
| 71b | Para-nonyl | do | 10.90 | 18.00 | 3.00 |
| 72b | do | do | 8.25 | 13.60 | 11.50 |
| 73b | do | do | 5.65 | 9.35 | 15.75 |
| 74b | do | do | 3.15 | 5.25 | 13.45 |
| 75b | do | do | 1.94 | 3.21 | 10.65 |
| 76b | Para-tertiary amyl | do | 12.60 | 16.20 | 3.50 |
| 77b | do | do | 9.52 | 12.24 | 12.89 |
| 78b | do | do | 6.50 | 8.30 | 17.75 |
| 79b | do | do | 4.25 | 5.45 | 17.25 |
| 80b | do | do | 2.69 | 3.43 | 14.55 |

NOTE.—For ease of comparison blanks appear in the above table where blanks appear in previously mentioned tables in U. S. Patent 2,581,376.

Oxypropylated derivatives comparable to 1b through 80b as described above can readily be obtained by substituting a molar equivalent amount of propylene oxide, i. e., 56 lbs. of propylene oxide, for example, for each 44 lbs. of ethylene oxide. We have prepared such a similar series but for sake of brevity only a few will be included for purposes of illustration.

TABLE III

| Ex. No. | Oxypropylated analog | Phenol | Aldehyde | Solvent, lbs. | Resin, lbs. | Propylene oxide, lbs. |
|---|---|---|---|---|---|---|
| 1c | 1b | Para-tertiary amyl | Formaldehyde | 14.25 | 15.75 | 5.10 |
| 2c | 2b | ----do---- | ----do---- | 10.90 | 12.10 | 19.40 |
| 3c | 3b | ----do---- | ----do---- | 7.13 | 7.93 | 25.30 |
| 4c | 4b | ----do---- | ----do---- | 3.84 | 4.25 | 23.00 |
| 5c | 5b | ----do---- | ----do---- | 1.80 | 2.04 | 13.00 |
| 66c | 66b | Para-octyl | Propionaldehyde | 13.30 | 16.90 | 3.82 |
| 67c | 67b | ----do---- | ----do---- | 10.20 | 12.90 | 14.40 |
| 68c | 68b | ----do---- | ----do---- | 6.46 | 8.24 | 21.00 |
| 69c | 69b | ----do---- | ----do---- | 3.86 | 4.87 | 16.60 |
| 70c | 70b | ----do---- | ----do---- | 2.94 | 3.75 | 16.80 |
| 76c | 76b | Para-tertiary amyl | Formaldehyde | 12.60 | 16.20 | 4.46 |
| 77c | 77b | ----do---- | ----do---- | 9.52 | 12.24 | 16.45 |
| 78c | 78b | ----do---- | ----do---- | 6.50 | 8.30 | 22.60 |
| 79c | 79b | ----do---- | ----do---- | 4.25 | 5.45 | 22.00 |
| 80c | 80b | ----do---- | ----do---- | 2.69 | 3.43 | 18.55 |

As an illustration of oxypropylated resins involving the use of both ethylene and propylene oxide, a reference is made to the aforementioned U. S. Patent 2,557,081, dated June 19, 1951, to De Groote and Keiser. The last table in column 28 of said patent describes in detail the preparation of a series of oxyalkylated resins in which both propylene and ethylene oxide are employed. Simply by illustration, a series of 27 compounds are included, the description of which appears in detail in said aforementioned U. S. Patent 2,577,081, to De Groote and Keiser.

TABLE IV

| Ex. No. | See U. S. Pat. 2,557,081 | | Resin used | Resin, lbs. | Ethylene oxide, lbs. | Propylene oxide, lbs. | Wt. of xylene | Flake caustic soda, ounces |
|---|---|---|---|---|---|---|---|---|
| | Ex. No. in above patent | Point on graph on above patent | | | | | | |
| 1d | A | 1 | Tert. amyl phenol formaldehyde | 6 | 3 | 1 | 10 | 1 |
| 2d | B | 5 | ----do---- | 5 | 4 | 1 | 10 | 1 |
| 3d | C | 8 | ----do---- | 3 | 6 | 1 | 10 | 1 |
| 4d | D | 2 | ----do---- | 1 | 21.5 | 2.5 | 25 | 2 |
| 5d | E | 9 | ----do---- | 1 | 15 | 9 | 25 | 2 |
| 6d | F | 6 | ----do---- | 1 | 10 | 15 | 25 | 2 |
| 7d | G | 3 | ----do---- | 1 | 2.5 | 21.5 | 25 | 2 |
| 8d | H | 7 | ----do---- | 5 | 1 | 4 | 10 | 1 |
| 9d | I | 4 | ----do---- | 6 | 1 | 3 | 10 | 1 |
| 10d | A | 1 | Tert. butyl phenol formaldehyde | 6 | 3 | 1 | 10 | 1 |
| 11d | B | 5 | ----do---- | 5 | 4 | 1 | 10 | 1 |
| 12d | C | 8 | ----do---- | 3 | 6 | 1 | 10 | 1 |
| 13d | D | 2 | ----do---- | 1 | 21.5 | 2.5 | 25 | 2 |
| 14d | E | 9 | ----do---- | 1 | 15 | 9 | 25 | 2 |
| 15d | F | 6 | ----do---- | 1 | 10 | 14 | 25 | 2 |
| 16d | G | 3 | ----do---- | 1 | 2.5 | 21.5 | 25 | 2 |
| 17d | H | 7 | ----do---- | 5 | 1 | 4 | 10 | 1 |
| 18d | I | 4 | ----do---- | 6 | 1 | 3 | 10 | 1 |
| 19d | A | 1 | Nonyl phenol-formaldehyde | 6 | 3 | 1 | 10 | 1 |
| 20d | B | 5 | ----do---- | 5 | 4 | 1 | 10 | 1 |
| 21d | C | 8 | ----do---- | 3 | 6 | 1 | 10 | 1 |
| 22d | D | 2 | ----do---- | 1 | 21.5 | 2.5 | 25 | 2 |
| 23d | E | 9 | ----do---- | 1 | 15 | 9 | 25 | 2 |
| 24d | F | 6 | ----do---- | 1 | 10 | 14 | 25 | 2 |
| 25d | G | 3 | ----do---- | 1 | 2.5 | 21.5 | 25 | 2 |
| 26d | H | 7 | ----do---- | 5 | 1 | 4 | 10 | 1 |
| 27d | I | 4 | ----do---- | 6 | 1 | 3 | 10 | 1 |

Note the first series of nine compounds, 1d through 9d were prepared with propylene oxide, first and then ethylene oxide. The second nine compounds, 10d through 18d inclusive, were prepared using ethylene oxide first and then propylene oxide, and the last nine compounds, 19d through 27d, were prepared by random oxyalkylation, i. e., using a mixture of the two oxides.

In the preparation of the resins, our preference is to use hydrocarbon substituted phenols, particularly para-substituted, in which the substituted radical R contains 4 to 18 carbon atoms and particularly 4 to 14 carbon atoms. The amount of alkylene oxide introduced may be comparatively large in comparison to the initial resin. For instance, there may be as much as 50 parts by weight of an oxide or mixed oxides used for each part by weight of resin employed.

It will be noted that the various resins referred to in the aforementioned U. S. Patent 2,499,370 are substantially the same type of materials as referred to in Table I. For instance, resin 3a of the table is substantially the same as 2a of the patent; resin 20a of the table is substantially the same as 34a of the patent; and resin 38a of the table is the same as 3a of the patent.

In reaction with polyepoxides, and particularly diepoxides, a large number of the previously described oxyalkylated resins have been employed. For convenience, the following list is selected indicating the previously described compounds and their molecular weights. Such resins are generally employed as a 50% solution and the polyepoxide employed is a 50% solution, usually both reactants being dissolved in xylene and sufficient sodium methylate added to act as a catalyst, for instance, 1 to 2%.

TABLE V

| Example number | Molecular weight |
|---|---|
| 1b | 1,202 |
| 2b | 2,169 |
| 3b | 3,339 |
| 4b | 4,609 |
| 5b | 5,749 |
| 6b | 1,509 |
| 7b | 2,466 |
| 8b | 3,657 |
| 9b | 5,867 |
| 10b | 6,087 |
| 1c | 1,270 |
| 2c | 2,494 |
| 3c | 4,019 |
| 4c | 6,139 |
| 5c | 7,079 |
| 1d | 1,697 |
| 2d | 1,918 |
| 3d | 3,189 |
| 4d | 23,959 |
| 5d | 23,959 |
| 6d | 24,909 |
| 7d | 23,959 |
| 8d | 1,918 |
| 9d | 1,697 |

PART 4

As previously stated, the final stage reactions involve two moles of an oxyalkylated phenol-aldehyde resin of the kind previously described and one mole of a diglycidyl ether as specified. The reaction is essentially an oxyalkylation reaction and thus may be considered as merely a continuance of the previous oxyalkylation reaction involving a monoepoxide as differentiated from a polyepoxide and particularly a diepoxide. The reactions take place in substantially the same way, i. e., by the opportunity to react at somewhere above the boiling point of water and below the point of decomposition, for example, 130–185° C. in the presence of a small amount of alkaline catalyst. Since the polyepoxide is non-volatile as compared, for example, with ethylene oxide the reaction is comparatively simple. Purely from a mechanical standpoint it is a matter of convenience to conduct both classes of reactions in the same equipment. In other words, after the phenol-aldehyde resin has been reacted with ethylene oxide, propylene oxide or the like, it is subsequently reacted with a polyepoxide. The polyepoxide reaction can be conducted in an ordinary reaction vessel such as the usual glass laboratory equipment. This is particularly true of the kind used for resin manufacture as described in a number of patents, as for example, U. S. Patent No. 2,499,365. One can use a variety of catalysts in connection with the polyepoxide of the same class employed with monoepoxide. In fact, the reaction will go at an extremely slow rate without any catalyst at all. The usual catalyst include alkaline materials such as caustic soda, caustic potash, sodium methylate, etc. Other catalysts may be acidic in nature and are of the kind characterized by iron and tin chlorides. Furthermore, insoluble catalysts such as clays or specially prepared mineral catalysts have been used. For practical purposes, it is best to use the same catalyst as is used in the initial oxyalkylation step and in many cases there is sufficient residual catalyst to serve for the reaction involving the second oxyalkylation step, i. e., the polyepoxide. For this reason, we have preferred to use a small amount of finely divided caustic soda or sodium methylate as the initial catalyst and also the catalyst in the second stage. The amount generally employed is 1, 2, or 3% of these alkaline catalysts.

Actually, the reactions of polyepoxides with various resin materials have been thoroughly described in the literature and the procedure is, for all purposes, the same as with glycide which has been described previously.

It goes without saying that the reaction involving the polyepoxide can be conducted in the same manner as the monoepoxide as far as the presence of an inert solvent is concerned, i. e., one that is not oxyalkylation-susceptible. Generally speaking, this is most conveniently an aromatic solvent such as xylene or a higher boiling coal tar solvent, or else a similar high boiling aromatic solvent obtained from petroleum. One can employ an oxygenated solvent such as the diethylether of ethylene glycol, or the diethylether of propylene glycol, or similar ethers, either alone or in combination with a hydrocarbon solvent. The solvent so selected should be one which, of course, is suitable in the oxyalkylation step involving the monoepoxides described subsequently. The solvent selected may depend on the ability to remove it by subsequent distillation if required. Here again it has been our preference to have a solvent present in the oxyalkylation involving the initial stage and permitting the solvent to remain. The amount of solvent may be insignificant, depending whether or not exhaustive oxypropylation is employed. However, since the oxypropylated phenol-aldehyde resins are almost invariably liquids there is no need for the presence of a solvent as when oxyalkylation involves a solid which may be rather high melting. Thus, it is immaterial whether there is solvent present or not and it is immaterial whether solvent was added in the first stage of oxyalkylation or not, and also it is immaterial whether there was solvent present in the second stage of oxyalkylation or not. The advantage of the presence of solvent is that sometimes it is a convenient way of controlling the reaction temperature and thus in the subsequent examples we have added sufficient xylene so as to produce a mixture which boils somewhere in the neighborhood of 125° to 140° C. and removes xylene so as to bring the boiling point of the mixture to about 140° C. during part of the reaction and subsequently removing more xylene so that the mixture refluxed at somewhere between 170° to 190° C. This was purely a convenience and need not be employed unless desired.

Example 1e

The oxyalkylated resin employed was the one previously identified as 2b, having a molecular weight of 2169; the amount employed was 217 grams. The resin was dissolved in approximately an equal weight of xylene. The mixture was heated to just short of the boiling point of water, i. e., a little below 100° C. Approximately one half percent of sodium methylate was added, or, more exactly, 1.1 grams. The stirring was continued until there was a solution or distribution of the catalyst. The mixture was heated to a little past 100° C. and left at this temperature while 18.5 grams of the diepoxide (previously identified as A), dissolved in an equal weight of xylene, were added. After the diepoxide was added the temperature was permitted to rise to approximately 109° C. The time required to add the diepoxide was approximately one-half hour. The temperature rose in this period to about 127° C. The temperature rise was controlled by allowing the xylene to reflux over and to separate out the xylene by a phase separating trap. In any event, the temperature was raised shortly to 158–150° C. and allowed to reflux at this temperature for almost three hours. Tests indicted that the reaction was complete at the end of this time; in fact, it probably was complete at a considerably earlier stage. The xylene which had been separated out was returned to the mixture so that the reaction mass at the end of the procedure represented about 50% reaction product and 50% solvent. The procedure employed is, of course, simple in light of what has been said previously; in fact, it corresponds to the usual procedure employed in connection with an oxyalkylating agent such as glycide, i. e., a non-volatile oxyalkylating agent. At the end of the reaction period the mass obtained was a dark, viscous mixture. It could be bleached, of course, by use of charcoal, filtering earths, or the like.

Various examples obtained in substantially the same manner as employed are described in the following tables:

TABLE VI

| Ex. No. | Oxyalkylated resin | Amt., gms. | Diepoxide used | Amt., gms. | Catalyst (NaOCH₃), grams | Xylene, gms. | Molar ratio | Time of reaction, hrs. | Max. temp., °C. | Color and physical state |
|---|---|---|---|---|---|---|---|---|---|---|
| 1c | 2b | 217 | A | 18.5 | 1.1 | 235.5 | 2:1 | 3 | 150 | Dark, viscous mass. |
| 2c | 4b | 460 | A | 18.5 | 2.3 | 478.5 | 2:1 | 4 | 155 | Do. |
| 3c | 7b | 247 | A | 18.5 | 1.3 | 265.5 | 2:1 | 3 | 152 | Do. |
| 4c | 10b | 609 | A | 18.5 | 3.1 | 627.5 | 2:1 | 5 | 158 | Do. |
| 5c | 2c | 249 | A | 18.5 | 1.3 | 267.5 | 2:1 | 3 | 145 | Do. |
| 6c | 3c | 402 | A | 18.5 | 2.1 | 420.5 | 2:1 | 4 | 150 | Do. |
| 7c | 5c | 708 | A | 18.5 | 3.6 | 726.5 | 2:1 | 5 | 156 | Do. |
| 8c | 2d | 192 | A | 18.5 | 1.0 | 210.5 | 2:1 | 3 | 150 | Do. |
| 9c | 3d | 319 | A | 18.5 | 1.6 | 337.5 | 2:1 | 3 | 152 | Do. |
| 10c | 6d | 249 | A | 1.9 | 1.2 | 251.0 | 2:1 | 3 | 155 | Do. |
| 1d | 2b | 217 | B | 11.0 | 1.1 | 228.0 | 2:1 | 3 | 148 | Do. |
| 2d | 4b | 460 | B | 11.0 | 2.3 | 471.0 | 2:1 | 4 | 150 | Do. |
| 3d | 7b | 247 | B | 11.0 | 1.2 | 258.0 | 2:1 | 3 | 145 | Do. |
| 4d | 10b | 609 | B | 11.0 | 3.0 | 620.0 | 2:1 | 5 | 155 | Do. |
| 5d | 2c | 249 | B | 11.0 | 1.3 | 260 | 2:1 | 3 | 142 | Do. |
| 6d | 3c | 402 | B | 11.0 | 2.0 | 413 | 2:1 | 4 | 150 | Do. |
| 7d | 5c | 708 | B | 11.0 | 3.5 | 719 | 2:1 | 5 | 155 | Do. |
| 8d | 2d | 192 | B | 11.0 | 1.0 | 203 | 2:1 | 3 | 148 | Do. |
| 9d | 3d | 319 | B | 11.0 | 1.6 | 330 | 2:1 | 3 | 150 | Do. |
| 10d | 6d | 249 | B | 1.1 | 1.2 | 250 | 2:1 | 3 | 150 | Do. |

TABLE VII

| Ex. No. | Oxyalkylated resin used | Probable molecular wt. of reaction product | Amount of product, grams | Amount of solvent, grams |
|---|---|---|---|---|
| 1c | 2b | 4,710 | 4,710 | 2,355 |
| 2c | 4b | 9,570 | 4,785 | 2,390 |
| 3c | 7b | 5,310 | 5,310 | 2,655 |
| 4c | 10b | 12,550 | 6,275 | 3,128 |
| 5c | 2c | 5,350 | 5,350 | 2,675 |
| 6c | 3c | 8,410 | 4,200 | 2,100 |
| 7c | 5c | 14,530 | 7,265 | 3,632 |
| 8c | 2d | 4,210 | 4,210 | 2,100 |
| 9c | 3d | 6,750 | 6,750 | 3,375 |
| 10c | 6d | 50,190 | 5,020 | 2,510 |
| 1d | 2b | 4,560 | 4,560 | 2,280 |
| 2d | 4b | 9,420 | 4,710 | 2,355 |
| 3d | 7b | 5,160 | 5,150 | 2,570 |
| 4d | 10b | 12,400 | 6,200 | 3,100 |
| 5d | 2c | 5,200 | 5,200 | 2,600 |
| 6d | 3c | 8,260 | 4,130 | 2,065 |
| 7d | 5c | 14,380 | 7,190 | 3,590 |
| 8d | 2d | 4,060 | 4,060 | 2,030 |
| 9d | 3d | 6,600 | 6,600 | 3,300 |
| 10d | 6d | 50,040 | 5,000 | 2,500 |

PART 5

As will be pointed out subsequently, the preparation of polyepoxides may include the formation of a small amount of material having more than two epoxide groups per molecule. If such compounds are formed they are perfectly suitable except to the extent they may tend to produce ultimate reaction products which are not solvent-soluble liquids or low-melting solids. Indeed, they tend to form thermosetting resins or insoluble materials. Thus, the specific objective by and large is to produce diepoxides as free as possible from any monoepoxides and as free as possible from polyepoxides in which there are more than two epoxide groups per molecule. Thus, for practical purposes what is said hereinafter is largely limited to polyepoxides in the form of diepoxides.

As has been pointed out previously one of the reactants employed is a diepoxide reactant. It is generally obtained from phenol (hydroxybenzene) or substituted phenol. The ordinary or conventional manufacture of the epoxides usually results in the formation of a co-generic mixture as explained subsequently. Preparation of the monomer or separation of the monomer from the remaining mass of the co-generic mixture is usually expensive. If monomers were available commercially at a low cost, or if they could be prepared without added expense for separation, our preference would be to use the monomer. Certain monomers have been prepared and described in the literature and will be referred to subsequently. However, from a practical standpoint one must weigh the advantage, if any, that the monomer has over other low molal polymers from a cost standpoint; thus, we have found that one might as well attempt to prepare a monomer and fully recognize that there may be present, and probably invariably are present, other low molal polymers in comparatively small amounts. Thus, the materials which are most apt to be used for practical reasons are either monomers with some small amounts of polymers present or mixtures which have a substantial amount of polymers present. Indeed, the mixture can be prepared free from monomers and still be satisfactory. Briefly, then, our preference is to use the monomer or the monomer with the minimum amount of higher polymers.

It has been pointed out previously that the phenolic nuclei in the epoxide reactant may be directly united, or united through a variety of divalent radicals. Actually, it is our preference to use those which are commercially available and for most practical purposes it means instances where the phenolic nuclei are either united directly without any intervening linking radical, or else united by a ketone residue or formaldehyde residue. The commercial bis-phenols available now in the open market illustrate one class. The diphenyl derivatives illustrate a second class, and the materials obtained by reacting substituted monofunctional phenols with an aldehyde illustrate the third class. All the various known classes may be used but our preference rests with these classes due to their availability and ease of preparation, and also due to the fact that the cost is lower than in other examples.

Although the diepoxide reactants can be produced in more than one way, as pointed out elsewhere, our preference is to produce them by means of the epichlorohydrin reaction referred to in detail subsequently.

One epoxide which can be purchased in the open market and contains only a modest amount of polymers corresponds to the derivative of bis-phenol A. It can be used as such, or the monomer can be separated by an added step which involves additional expense. This compound of the following structure is preferred as the epoxide reactant and will be used for illustration repeatedly with the full understanding that any of the other epoxides described are equally satisfactory, or that the higher polymers are satisfactory, or that mixtures of the monomer and higher polymers are satisfactory. The formula for this compound is

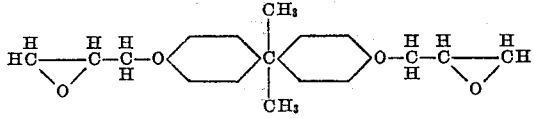

Reference has just been made to bis-phenol A and a suitable epoxide derived therefrom. Bis-phenol A is dihydroxy-diphenyldimethyl methane, with the 4,4′ isomers predominating and with lesser quantities of the 2,2′ and 4,2′ isomers being present. It is immaterial which one of these isomers is used and the commercially available mixture is entirely satisfactory.

Attention is again directed to the fact that in the instant part, to wit, Part 5, and in succeeding parts, the text is concerned almost entirely with epoxides in which there is no bridging radical or the bridging radical is derived from an aldehyde or a ketone. It would be immaterial if the divalent linking radical would be derived from the other groups illustrated for the reason that nothing more than mere substitution of one compound for the other would be required. Thus, what is said hereinafter, although directed to one class or a few classes, applies with equal force and effect to the other classes of epoxide reactants.

If sulfur-containing compounds are prepared they should be freed from impurities with considerable care for the reason that any time that a low-molal sulfur-containing compound can react with epichlorohydrin there may be formed a by-product in which the chlorine happened to be particularly reactive and may represent a product, or a mixture of products, which would be unusually toxic, even though in comparatively small concentration.

PART 6

The polyepoxides and particularly the diepoxides can be derived by more than one method as, for example, the use of epichlorohydrin or glycerol dichlorohydrin. If a product such as bis-phenol A is employed the ultimate compound in monomeric form employed as a reactant in the present invention has the following structure:

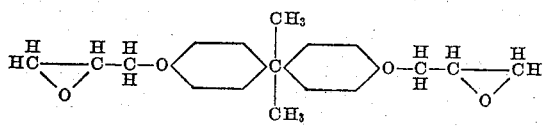

Treatment with epichlorohydrin, for example, does not yield this product initially but there is an intermediate produced which can be indicated by the following structure:

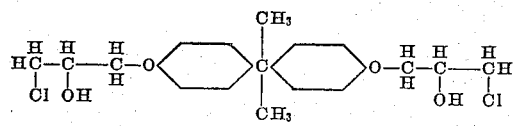

Treatment with alkali, of course, forms the epoxy ring. A number of problems are involved in attempting to produce this compound free from cogeneric materials of related composition. The difficulty stems from a number of sources and a few of the more important ones are as follows:

(1) The closing of the epoxy ring involves the use of caustic soda or the like which, in turn, is an effective catalyst in causing the ring to open in an oxyalkylation reaction.

Actually, what may happen for any one of a number of reasons is that one obtains a product in which there is only one epoxide ring and there may, as a matter of fact, be more than one hydroxyl radical as illustrated by the following compounds:

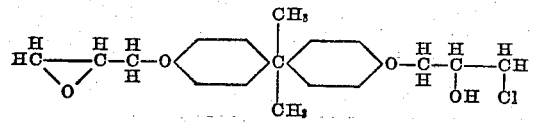

or

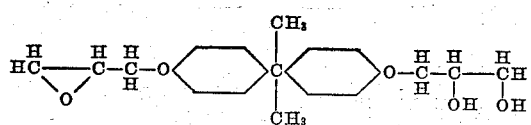

(2) Even if one starts with the reactants in the preferred ratio, to wit, two parts of epichlorohydrin to one part of bis-phenol A, they do not necessarily so react and as a result one may obtain products in which more than two epichlorohydrin residues become attached to a single bis-phenol A nucleus by virtue of the reactive hydroxyls present which enter into oxyalkylation reactions rather than ring closure reactions.

(3) As is well known, ethylene oxide in the presence of alkali, and for that matter in the complete absence of water, forms cyclic polymers. Indeed, ethylene oxide can produce a solid polymer. This same reaction can, and at times apparently does, take place in connection with compounds having one, or in the present instance, two substituted oxirane rings, i. e., substituted 1,2 epoxy rings. Thus, in many ways it is easier to produce a polymer, particularly a mixture of the monomer, dimer and trimer, than it is to produce the monomer alone.

(4) As has been pointed out previously, monoepoxides may be present and, indeed, are almost invariably and inevitably present when one attempts to produce polyepoxides, and particularly diepoxides. The reason is the one which has been indicated previously, together with the fact that in the ordinary course of reaction a diepoxide, such as

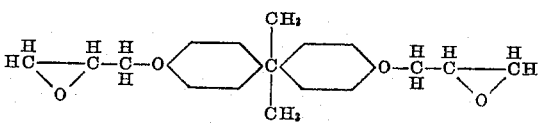

may react with a mole of bis-phenol A to give a monoepoxy structure. Indeed, in the subsequent text immediately following reference is made to the dimers, trimers and tetramers in which two epoxide groups are present. Needless to say, compounds can be formed which correspond in every respect except that one terminal epoxide group is absent and in its place is a group having one chlorine atom and one hydroxyl group, or else two hydroxyl groups, or an unreacted phenolic ring.

(5) Some reference has been made to the presence of a chlorine atom and although all effort is directed towards the elimination of any chlorine-containing molecule yet it is apparent that this is often an ideal approach rather than a practical possibility. Indeed, the same sort of reactants are sometimes employed to obtain products in which intentionally there is both an epoxide group and a chlorine atom present. See U. S. Patent No. 2,581,464, dated January 8, 1952, to Zech.

What has been said in regard to the theoretical aspect is, of course, closely related to the actual method of preparation which is discussed in greater detail in Part 7, particularly subdivisions A and B. There can be no clear line between the theoretical aspect and actual preparative steps. However, in order to summarize or illustrate what has been said in Part 5, immediately preceding reference will be made to a typical example which already has been employed for purpose of illustration. The particular example is

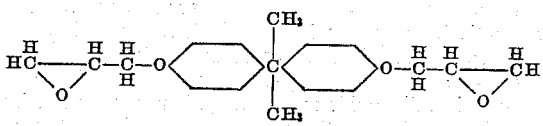

It is obvious that two moles of such material combine readily with one mole of bis-phenol A,

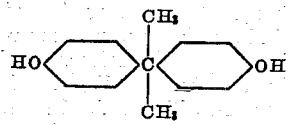

to produce the product which is one step further along, at least, towards polymerization. In other words, one prior example shows the reaction product obtained from one mole of the bisphenol A and two moles of epichlorohydrin. This product in turn would represent three moles of bisphenol A and four moles of epichlorohydrin.

For purpose of brevity, without going any further, the next formula is in essence one which, perhaps in an idealized way, establishes the composition of resinous products available under the name of Epon Resins as now sold in the open market. See, also, chemical pamphlet entitled "Epon Surface-Coating Resins," Shell Chemical Corporation, New York city. The word "Epon" is a registered trademark of the Shell Chemical Corporation.

Such a compound is comparable to other compounds having both the hydroxyl and epoxy ring such as 9,10-epoxy octadecanol. The ease with which this type of compound polymerizes is pointed out by U. S. Patent No. 2,457,329, dated December 28, 1948, to Swern et al.

The same difficulty which involves the tendency to

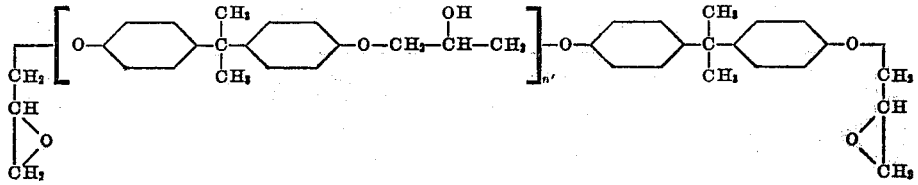

For the purpose of the instant invention, $n'$ may represent a number including zero, and at the most a low number such as 1, 2 or 3. This limitation does not exist in actual efforts to obtain resins as differentiated from the herein described soluble materials. It is quite probable that in the resinous products as marketed for coating use the value of $n'$ is usually substantially higher. Note again what has been said previously that any formula is, at best, an over-simplification, or at the most represents perhaps only the more important or principal constituent or constituents. These materials may vary from simple non-resinous to complex resinous epoxides which are polyether derivatives of polyhydric phenols containing an average of more than one epoxide group per molecule and free from functional groups other than epoxide and hydroxyl groups.

Referring now to what has been said previously, to wit, compounds having both an epoxy ring or the equivalent and also a hydroxyl group, one need go no further than to consider the reaction product of polymerize on the part of compounds having a reactive ring and a hydroxyl radical may be illustrated by compounds where, instead of the oxirane ring (1,2-epoxy ring) there is present a 1,3-epoxy ring. Such compounds are derivatives of trimethylene oxide rather than ethylene oxide. See U. S. Patents Nos. 2,462,047 and 2,462,048, both dated February 15, 1949, to Wyler.

At the expense of repetition of what appeared previously, it may be well to recall that these materials may vary from simple soluble non-resinous to complex non-soluble resinous epoxides which are polyether derivatives of polyhydric phenols containing an average of more than one epoxide group per molecule and free from functional groups other than epoxide and hydroxyl groups. The former are here included, but the latter, i. e., highly resinous or insoluble types, are not.

In summary then in light of what has been said, compounds suitable for reaction with amines may be summarized by the following formula:

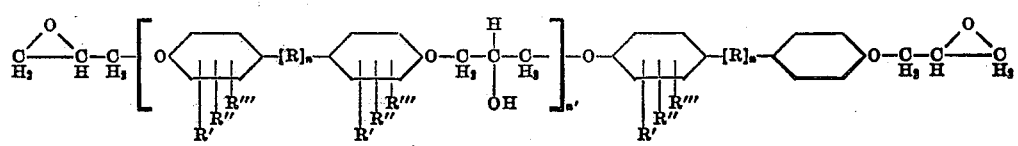

or for greater simplicity the formula could be restated thus:

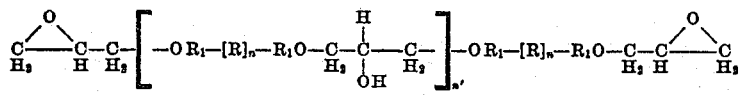

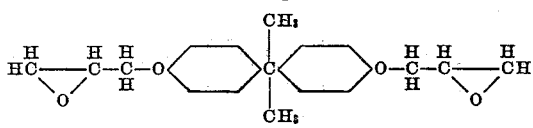

and bisphenol A in a mole-for-mole ratio, since the initial reactant would yield a product having an unreacted epoxy ring and two reactive hydroxyl radicals. Referring again to a previous formula, consider an example where two moles of bisphenol A have been reacted with 3 moles of epichlorohydrin. The simplest compound formed would be thus:

in which the various characters have their prior significance and in which $R_1O$ is the divalent radical obtained by the elimination of a hydroxyl hydrogen atom and a nuclear hydrogen atom from the phenol

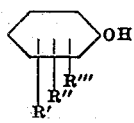

in which $R'$, $R''$, and $R'''$ represent hydrogen and hydrocarbon substituents of the aromatic nucleus, said sub-

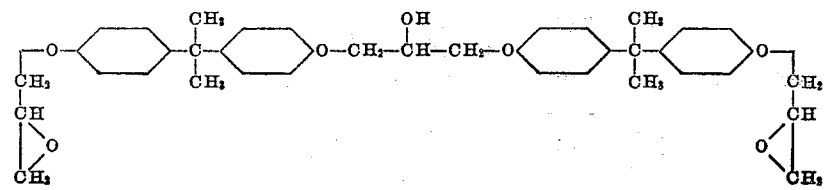

stituent member having not over 18 carbon atoms; $n$ represents an integer selected from the class of zero and 1, and $n'$ represents a whole number not greater than 3.

included for purpose of illustration. These particular compounds are described in the two patents just mentioned.

TABLE VIII

| Example number | Diphenol | Diglycidyl ether | Patent reference |
|---|---|---|---|
| 1A | $CH_2(C_6H_4OH)_2$ | Di(epoxypropoxyphenyl)methane | 2,506,486 |
| 2A | $CH_3CH(C_6H_4OH)_2$ | Di(epoxypropoxyphenyl)methylmethane | 2,506,486 |
| 3A | $(CH_3)_2C(C_6H_4OH)_2$ | Di(epoxypropoxyphenyl)dimethylmethane | 2,506,486 |
| 4A | $C_2H_5C(CH_3)(C_6H_4OH)_2$ | Di(epoxypropoxyphenyl)ethylmethylmethane | 2,506,486 |
| 5A | $(C_2H_5)_2C(C_6H_4OH)_2$ | Di(epoxypropoxyphenyl)diethylmethane | 2,506,486 |
| 6A | $CH_3C(C_3H_7)(C_6H_4OH)_2$ | Di(eopxypropoxyphenyl)methylpropylmethane | 2,506,486 |
| 7A | $CH_3C(C_6H_5)(C_6H_4OH)_2$ | Di(epoxypropoxyphenyl)methylphenylmethane | 2,506,486 |
| 8A | $C_2H_5C(C_6H_5)(C_6H_4OH)_2$ | Di(epoxypropoxyphenyl)ethylphenylmethane | 2,506,486 |
| 9A | $C_3H_7C(C_6H_5)(C_6H_4OH)_2$ | Di(epoxypropoxyphenyl)propylphenylmethane | 2,506,486 |
| 10A | $C_4H_9C(C_6H_5)(C_6H_4OH)_2$ | Di(epoxypropoxyphenyl)butylphenylmethane | 2,506,486 |
| 11A | $(CH_3C_6H_4)CH(C_6H_4OH)_2$ | Di(epoxypropoxyphenyl)tolylmethane | 2,506,486 |
| 12A | $(CH_3C_6H_4)C(CH_3)(C_6H_3OH)_2$ | Di(epoxypropoxyphenyl)tolylmethylmethane | 2,506,486 |
| 13A | Dihydroxy diphenyl | 4,4'-bis(2,3-epoxypropoxy)diphenyl | 2,530,353 |
| 14A | $(CH_3)C(C_4H_5.C_6H_3OH)_2$ | 2,2-bis(4-(2,3-epoxypropoxy)2-tertiarybutyl phenyl)propane | 2,530,353 |

PART 7

Subdivision A

The preparations of the diepoxy derivatives of the diphenols, which are sometimes referred to as diglycidyl ethers, have been described in a number of patents. For convenience, reference will be made to two only, to wit, aforementioned U. S. Patent 2,506,486, and aforementioned U. S. Patent No. 2,530,353.

Purely by way of illustration, the following diepoxides, or diglycidyl ethers as they are sometimes termed, are

Subdivision B

As to the preparation of low-molal polymeric epoxides or mixtures reference is made to numerous patents and particularly the aforementioned U. S. Patents Nos. 2,575,558 and 2,582,985.

In light of aforementioned U. S. Patent No. 2,575,558, the following examples can be specified by reference to the formula therein provided one still bears in mind it is in essence an over-simplification.

TABLE IX

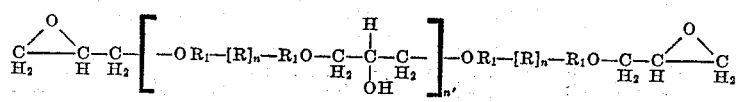

(in which the characters have their previous significance)

| Example number | —$R_1O$— from $HR_1OH$ | —R— | $n$ | $n'$ | Remarks |
|---|---|---|---|---|---|
| B1 | Hydroxy benzene | $\begin{array}{c}CH_3\\|\\-C-\\|\\CH_3\end{array}$ | 1 | 0, 1, 2 | Phenol known as bis-phenol A. Low polymeric mixture about ⅔ or more where $n'=0$, remainder largely where $n'=1$, some where $n'=2$. |
| B2 | ----do---- | $\begin{array}{c}CH_3\\|\\-C-\\|\\CH_2\\|\\CH_3\end{array}$ | 1 | 0, 1, 2 | Phenol known as bis-phenol B. See note regarding B1 above. |
| B3 | Orthobutylphenol | $\begin{array}{c}CH_3\\|\\-C-\\|\\CH_3\end{array}$ | 1 | 0, 1, 2 | Even though $n'$ is preferably 0, yet the usual reaction product might well contain materials where $n'$ is 1, or to a lesser degree 2. |
| B4 | Orthoamylphenol | $\begin{array}{c}CH_3\\|\\-C-\\|\\CH_3\end{array}$ | 1 | 0, 1, 2 | Do. |
| B5 | Orthooctylphenol | $\begin{array}{c}CH_3\\|\\-C-\\|\\CH_3\end{array}$ | 1 | 0, 1, 2 | Do. |
| B6 | Orthononylphenol | $\begin{array}{c}CH_3\\|\\-C-\\|\\CH_3\end{array}$ | 1 | 0, 1, 2 | Do. |
| B7 | Orthododecylphenol | $\begin{array}{c}CH_3\\|\\-C-\\|\\CH_3\end{array}$ | 1 | 0, 1, 2 | Do. |

TABLE IX—Continued

| Example number | —R₁O— from HR₁OH | —R— | $n$ | $n'$ | Remarks |
|---|---|---|---|---|---|
| B8 | Metacresol | $-\underset{\underset{CH_3}{\mid}}{\overset{\overset{CH_3}{\mid}}{C}}-$ | 1 | 0, 1, 2 | See prior note. This phenol used as initial material is known as bis-phenol C. For other suitable bis-phenols see U. S. Patent 2,564,191. |
| B9 | do | $-\underset{\underset{\underset{CH_3}{\mid}}{\underset{CH_2}{\mid}}}{\overset{\overset{CH_3}{\mid}}{C}}-$ | 1 | 0, 1, 2 | See prior note. |
| B10 | Dibutyl (ortho-para) phenol | $-\underset{H}{\overset{H}{C}}-$ | 1 | 0, 1, 2 | Do. |
| B11 | Diamyl (ortho-para) phenol | $-\underset{H}{\overset{H}{C}}-$ | 1 | 0, 1, 2 | Do. |
| B12 | Dioctyl (ortho-para) phenol | $-\underset{H}{\overset{H}{C}}-$ | 1 | 0, 1, 2 | Do. |
| B13 | Dinonyl (ortho-para) phenol | $-\underset{H}{\overset{H}{C}}-$ | 1 | 0, 1, 2 | Do. |
| B14 | Diamyl (ortho-para) phenol | $-\underset{CH_3}{\overset{H}{C}}-$ | 1 | 0, 1, 2 | Do. |
| B15 | do | $-\underset{C_2H_5}{\overset{H}{C}}-$ | 1 | 0, 1, 2 | Do. |
| B16 | Hydroxy benzene | $-\underset{O}{\overset{O}{S}}-$ | 1 | 0, 1, 2 | Do. |
| B17 | Diamyl phenol (ortho-para) | —S—S— | 1 | 0, 1, 2 | Do. |
| B18 | do | —S— | 1 | 0, 1, 2 | Do. |
| B19 | Dibutylphenol (ortho-para) | $-\underset{H}{\overset{H}{C}}-\underset{H}{\overset{H}{C}}-$ | 1 | 0, 1, 2 | Do. |
| B20 | do | $-\underset{H}{\overset{H}{C}}-\underset{H}{\overset{H}{C}}-$ | 1 | 0, 1, 2 | Do. |
| B21 | Dinonylphenol (ortho-para) | $-\underset{H}{\overset{H}{C}}-\underset{H}{\overset{H}{C}}-$ | 1 | 0, 1, 2 | Do. |
| B22 | Hydroxy benzene | $-\overset{\overset{O}{\parallel}}{C}-$ | 1 | 0, 1, 2 | Do. |
| B23 | do | None | 0 | 0, 1, 2 | Do. |
| B24 | Ortho-isopropyl | $-\underset{CH_3}{\overset{CH_3}{C}}-$ | 1 | 0, 1, 2 | See prior note. As to preparation of 4,4'-isopropylidene bis-(2-isopropylphenol) see U. S. Patent No. 2,482,748, dated Sept. 27, 1949, to Dietzler. |
| B25 | Para-octyl | —CH₂—S—CH₂— | 1 | 0, 1, 2 | See prior note. (As to preparation of the phenol sulfide see U. S. Patent No. 2,488,134, dated Nov. 15, 1949, to Mikeska et al.) |
| B26 | Hydroxybenzene | $-\underset{\underset{\underset{C_2H_5}{\mid}}{\underset{O}{\mid}}}{\overset{\overset{CH_3}{\mid}}{C}}-$ CH₃ | 1 | 0, 1, 2 | See prior note. (As to preparation of the phenol sulfide see U. S. Patent No. 2,526,545.) |

*Subdivision C*

The prior examples have been limited largely to those in which there is no divalent linking radical, as in the case of diphenyl compounds, or where the linking radical is derived from a ketone or aldehyde, particularly a ketone. Needless to say, the same procedure is employed in converting diphenyl into a diglycidyl ether regardless of the nature of the bond between the two phenolic nuclei.

For purpose of illustration attention is directed to numerous other diphenols which can be readily converted to a suitable polyepoxide, and particularly diepoxide, reactant.

As previously pointed out the initial phenol may be substituted, and the substituent group in turn may be a cyclic group such as the phenyl group or cyclohexyl group as in the instance of cyclohexylphenol or phenylphenol. Such substituents are usually in the ortho position and may be illustrated by a phenol of the following composition:

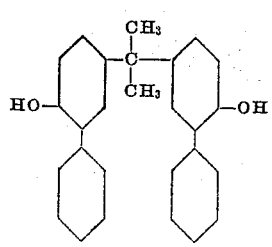

Similar phenols which are monofunctional, for instance, paraphenyl phenol or paracyclohexyl phenol with an additional substituent in the ortho position, may be employed in reactions previously referred to, for instance, with formaldehyde or sulfur chlorides to give comparable phenolic compounds having 2 hydroxyls and suitable for subsequent reaction with epichlorohydrin, etc.

Other samples include:

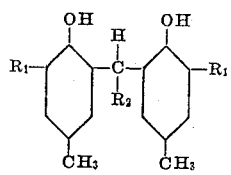

wherein $R_1$ is a substituent selected from the class consisting of secondary butyl and tertiary butyl groups and $R_2$ is a substituent selected from the class consisting of alkyl, cycloalkyl, aryl, aralkyl, and alkaryl groups, and wherein said alkyl group contains at least 3 carbon atoms. See U. S. Patent No. 2,515,907.

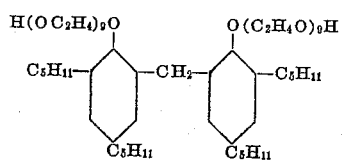

in which the —$C_5H_{11}$ groups are secondary amyl groups. See U. S. Patent No. 2,504,064.

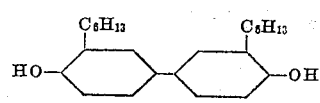

See U. S. Patent No. 2,285,563.

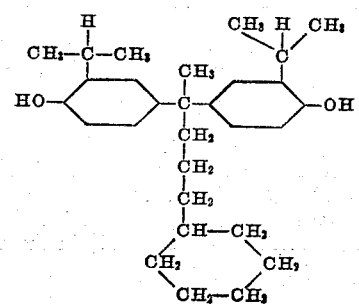

See U. S. Patent No. 2,503,196.

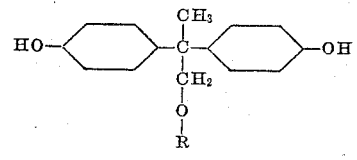

wherein R is a member of the group consisting of alkyl, and alkoxy-alkyl radicals containing from 1 to 5 carbon atoms, inclusive, and aryl and chloraryl radicals of the benzene series. See U. S. Patent No. 2,526,545.

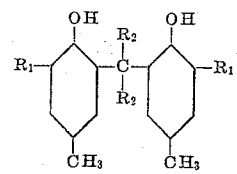

wherein $R_1$ is a substituent selected from the class consisting of secondary butyl and tertiary butyl groups and $R_2$ is a substituent selected from the class consisting of alkyl, cycloalkyl, aryl, aralkyl, and alkaryl groups. See U. S. Patent No. 2,515,906.

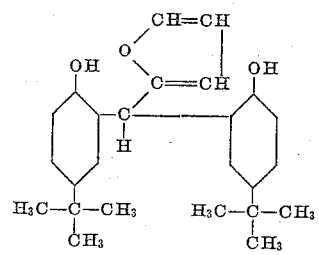

See U. S. Patent No. 2,515,908.

As to sulfides, the following compound is of interest:

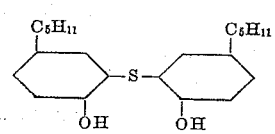

See U. S. Patent No. 2,331,448.

As to descriptions of various suitable phenol sulfides, reference is made to the following patents: U. S. Patents Nos. 2,246,321, 2,207,719, 2,174,248, 2,139,766, 2,244,021, and 2,195,539.

As to sulfones, see U. S. Patent No. 2,122,958.

As to suitable compounds obtained by the use of formaldehyde or some other aldehyde, particularly compounds such as

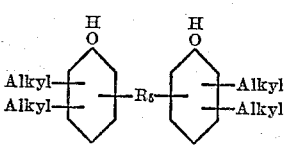

in which $R_5$ is a methylene radical, or a substituted methylene radical which represents the residue of an aldehyde and is preferably the unsubstituted methylene radical derived from formaldehyde. See U. S. Patent No. 2,430,002.

See also U. S. Patent No. 2,581,919 which describes di(dialkyl cresol) sulfides which include the monosulfides, the disulfides, and the polysulfides. The following formula represents the various dicresol sulfides of this invention:

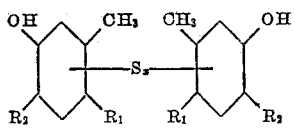

in which $R_1$ and $R_2$ are alkyl groups, the sum of whose carbon atoms equals 6 to about 20, and $R_1$ and $R_2$ each preferably contain 3 to about 10 carbon atoms, and $x$ is 1 to 4. The term "sulfides" as used in this text, therefore, includes monosulfide, disulfide, and polysulfides.

PART 8

As pointed out previously, the reaction described in Part 4, preceding, resulted in an intermediate which was described thus: (A—B—A). The reaction described in the instant part has been indicated thus:

$$2(A\text{—}B\text{—}A) + C \rightarrow A\text{—}B\text{—}A\text{—}C\text{—}A\text{—}B\text{—}A$$

The manufacturing procedure is, of course, merely a continuation of what has been described previously in Part 4 and it is simply a switch from the one type of polyepoxide to the other. Of course, after the hydrophile polyepoxide is added, sufficient time should pass to insure completeness of reaction before adding the hydrophobe type. For purpose of illustration, however, the following examples are included:

Example 1e

The polyepoxide derived intermediate is Example 1c, previously described in Table VI. This was obtained by use of a hydrophile polyepoxide. 235.5 grams were employed. This was reacted with 8.5 grams of diepoxide 3A previously described. The amount of xylene was 244 grams. The molal ratio was 2 moles of the polyepoxide derived intermediate to one mole of diepoxide 3A. The catalyst and the solvent and the intermediate were all mixed together and stirred. The diepoxide was then added slowly over a period of 20 minutes. The temperature was raised to 85° C. The reaction took place rapidly and was complete within an hour. Generally speaking, the hydrophile type of polyepoxide seems to react more rapidly than a hydrophobe type and quite often at a considerably lower temperature and a lower reaction time.

The product obtained was a dark viscous mass when the solvent was evaporated.

In a second series of derivatives hydrophobe diepoxide B1 was employed. This diepoxide has been described previously.

The data are summarized in hereto appended Tables X and XI.

TABLE XI

| Ex. No. | Oxyalkylated resin used | Prob. mol. weight of reaction product | Amount of product, grams | Amount of solvent, grams |
|---|---|---|---|---|
| 1e | 1c | 9,760 | 4,880 | 2,440 |
| 2e | 2c | 19,480 | 3,896 | 1,948 |
| 3e | 3c | 10,960 | 2,192 | 1,096 |
| 4e | 4c | 25,440 | 5,088 | 2,544 |
| 5e | 5c | 11,040 | 2,208 | 1,104 |
| 6e | 6c | 17,160 | 3,432 | 1,716 |
| 7e | 7c | 29,400 | 5,880 | 2,940 |
| 8e | 8c | 8,760 | 4,380 | 2,190 |
| 9e | 9c | 13,840 | 2,768 | 1,384 |
| 10e | 10c | 100,720 | 4,028 | 2,014 |
| 1f | 1d | 9,670 | 4,835 | 2,418 |
| 2f | 2d | 19,390 | 3,878 | 1,939 |
| 3f | 3d | 10,870 | 2,174 | 1,087 |
| 4f | 4d | 25,350 | 5,070 | 2,535 |
| 5f | 5d | 10,950 | 2,190 | 1,095 |
| 6f | 6d | 17,070 | 3,414 | 1,707 |
| 7f | 7d | 29,310 | 5,862 | 2,931 |
| 8f | 8d | 8,670 | 4,335 | 2,168 |
| 9f | 9d | 13,750 | 2,750 | 1,375 |
| 10f | 10d | 100,630 | 4,026 | 2,013 |

PART 9

As to the use of conventional demulsifying agents, reference is made to U. S. Patent No. 2,626,929, dated January 7, 1953, to De Groote, and particularly to Part 3. Everything that appears therein applies with equal force and effect to the instance process, noting only that where reference is made to Example 13b in said text beginning in column 15 and ending in column 18, reference should be to Example 2e, herein described.

Having thus described our invention what we claim as new and desire to obtain by Letters Patent is:

1. A process for breaking petroleum emulsions of the water-in-oil type, characterized by subjecting the emulsions to the action of a demulsifier including synthetic hydrophile products (ABACABA); said synthetic hydrophile products being obtained by a two-step process, the first step involving an intermediate (ABA) which, in turn, represents the reaction products of (A) an oxyalkylated phenol-aldehyde resin containing a plurality of active hydrogen atoms, and (B) a non-aryl hydrophile polyepoxide characterized by the fact that the precursory polyhydric alcohol, in which an oxygen-linked hydrogen atom is replaced subsequently by the radical

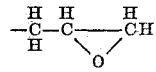

in the polyepoxide, is water-soluble; said polyepoxides being free from reactive functional groups other than epoxy and hydroxyl groups and characterized by the fact that the divalent linkage uniting the terminal oxirane rings is free from any radical having more than 4 uninterrupted carbon atoms in a single chain; said oxyal-

TABLE X

| Ex. No. | Polyepoxide derived intermediate product | Amt., gms. | Diepoxide used | Amt., gms. | Catalyst (NaOCH₃), gms. | Xylene, gms. | Molar ratio | Time of reaction, hrs. | Max. temp., ° C. | Color and physical state |
|---|---|---|---|---|---|---|---|---|---|---|
| 1e | 1c | 235.5 | 3A | 8.5 | 2.4 | 244 | 2:1 | 1 | 85 | Dark, viscous mass. |
| 2e | 2c | 478.5 | 3A | 8.5 | 4.8 | 487 | 2:1 | 1 | 80 | Do. |
| 3e | 3c | 265.5 | 3A | 8.5 | 2.6 | 274 | 2:1 | 1 | 82 | Do. |
| 4e | 4c | 627.5 | 3A | 8.5 | 6.3 | 634 | 2:1 | 1 | 85 | Do. |
| 5e | 5c | 267.5 | 3A | 8.5 | 2.7 | 276 | 2:1 | 1 | 80 | Do. |
| 6e | 6c | 420.0 | 3A | 8.5 | 4.3 | 429 | 2:1 | 1 | 86 | Do. |
| 7e | 7c | 726.5 | 3A | 8.5 | 7.3 | 735 | 2:1 | 1 | 82 | Do. |
| 8e | 8c | 210.5 | 3A | 8.5 | 2.2 | 219 | 2:1 | 1 | 84 | Do. |
| 9e | 9c | 337.5 | 3A | 8.5 | 3.4 | 346 | 2:1 | 1 | 80 | Do. |
| 10e | 10c | 401.9 | 3A | 1.7 | 5.0 | 504 | 2:1 | 1 | 80 | Do. |
| 1f | 1d | 228.0 | B1 | 13.8 | 2.4 | 242 | 2:1 | 1 | 80 | Do. |
| 2f | 2d | 471.0 | B1 | 13.8 | 4.8 | 485 | 2:1 | 1 | 82 | Do. |
| 3f | 3d | 258.0 | B1 | 13.8 | 2.7 | 272 | 2:1 | 1 | 80 | Do. |
| 4f | 4d | 620.0 | B1 | 13.8 | 6.3 | 634 | 2:1 | 1 | 84 | Do. |
| 5f | 5d | 260.0 | B1 | 13.8 | 2.7 | 274 | 2:1 | 1 | 83 | Do. |
| 6f | 6d | 413.0 | B1 | 13.8 | 4.2 | 427 | 2:1 | 1 | 80 | Do. |
| 7f | 7d | 719.0 | B1 | 13.8 | 7.3 | 733 | 2:1 | 1 | 80 | Do. |
| 8f | 8d | 203.0 | B1 | 13.8 | 2.1 | 217 | 2:1 | 1 | 80 | Do. |
| 9f | 9d | 330.0 | B1 | 13.8 | 2.4 | 344 | 2:1 | 1 | 81 | Do. |
| 10f | 10d | 500.4 | B1 | 2.8 | 5.0 | 505 | 2:1 | 1 | 80 | Do. | kylated phenol-aldehyde resins, reactant (A) being the products derived by oxyalkylation of (aa) an alpha-beta alkylene oxide having not more than 4 carbon atoms and selected from the class consisting of ethylene oxide, propylene oxide, butylene oxide, glycide and methylglycide, and (bb) an oxyalkylation-susceptible fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

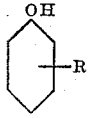

in which R is a hydrocarbon radical having not more than 24 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 120; with the proviso that at least 2 moles of alkylene oxide be introduced for each phenolic nucleus, and that the resin by weight represent at least 2% of the oxyalkylated derivative; the ratio of reactant (A) to reactant (B) being in the proportion of two moles of (A) to one mole of (B); with the further proviso that said reactive compounds (A) and (B) be members of the class consisting of non-thermosetting organic solvent-soluble liquids and low-melting solids; with the final proviso that the reaction product be a member of the class of oxyalkylation- and acylation-susceptible solvent-soluble liquids and low-melting solids; and said reaction between (A) and (B) being conducted below the pyrolytic point of the reactants and the resultants of reaction; said second step being the reaction product between 2 moles of the aforementioned intermediate (ABA) and one mole of (C) a phenolic polyepoxide free from reactive functional groups other than epoxy and hydroxyl groups, and cogenerically associated compounds formed in the preparation of said polyepoxides; said epoxides being monomers and low molal polymers not exceeding the tetramers; said epoxides being selected from the class consisting of (a) compounds where the phenolic nuclei are directly joined without an intervening bridge radical, and (b) compounds containing a radical in which two phenolic nuclei are joined by a divalent radical selected from the class consisting of ketone residues formed by the elimination of the ketonic oxygen atom, and aldehyde residues obtained by the elimination of the aldehyde oxygen atom, the divalent radical

the divalent

radical, the divalent sulfone radical, and the divalent monosulfide radical —S—, the divalent radical

—CH₂SCH₂— and the divalent disulfide radical —S—S—; said phenolic portion of the diepoxide being obtained from a phenol of the structure

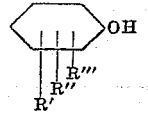

in which R′, R″, and R‴ represent a member of the class consisting of hydrogen and hydrocarbon substituents of the aromatic nucleus, said substitutent member having not over 18 carbon atoms; said final product being a member of the class consisting of non-thermosetting organic solvent-soluble liquids and low-melting solids; with the final proviso that the reaction product be a member of the class of solvent-soluble liquids and low-melting solids; and said reaction between (ABA) and (C) being below the pyrolytic point of the reactants and the resultants of reaction.

2. A process for breaking petroleum emulsions of the water-in-oil type, characterized by subjecting the emulsions to the action of a demulsifier including synthetic hydrophile products (ABACABA); said synthetic hydrophile products being obtained by a two-step process, the first step involving an intermediate (ABA) which, in turn, represents the reaction products of (A) an oxyalkylated phenol-aldehyde resin containing a plurality of active hydrogen atoms, and (B) a non-aryl hydrophile polyepoxide characterized by the fact that the precursory polyhydric alcohol, in which an oxygen-linked hydrogen atom is replaced subseqently by the radical

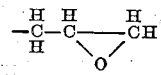

in the polyepoxide, is water-soluble; said polyepoxides being free from reactive functional groups other than epoxy and hydroxyl groups and characterized by the fact that the divalent linkage uniting the terminal oxirane rings is free from any radical having more than 4 uninterrupted carbon atoms in a single chain; said oxyalkylated phenol-aldehyde resins, reactant (A) being the products derived by oxyalkylation of (aa) an alpha-beta alkylene oxide having not more than 4 carbon atoms and selected from the class consisting of ethylene oxide, propylene oxide, butylene oxide, glycide and methylglycide, and (bb) an oxyalkylation-susceptible fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

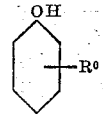

in which R⁰ is a hydrocarbon radical having not more than 24 carbon atoms and substituted in the 2,4,6 position; said oxyalkylated resin being characterized by the introduction into the resin molecule of a plurality of divalent radicals having the formula $(R_2O)_{n''}$, in which $R_2$ is a member selected from the class consisting of ethylene radicals, propylene radicals, butylene radicals, hydroxypropylene radicals, and hydroxybutylene radicals, and $n''$ is a numeral varying from 1 to 120; with the proviso that at least 2 moles of alkylene oxide be introduced for each phenolic nucleus, and that the resin by weight represent at least 2% of the oxyalkylated derivative; the ratio of reactant (A) to reactant (B) being in the proportion of two moles of (A) to one mole of (B); with the further proviso that said reactive compounds (A) and (B) be members of the class consisting of non-thermosetting organic solvent-soluble liquids and low-melting solids; with the final proviso that the reaction product be a member of the class of oxyalkylation- and acylation-susceptible solvent-soluble liquids and low-melting solids; and said reaction between (A) and (B) being conducted below the pyrolytic point of the reactants and the resultants of reaction; said second step being the reaction product between 2 moles of the aforementioned intermediate (ABA) and one mole of (C) a member of the class consisting of (1) compounds of the following formula

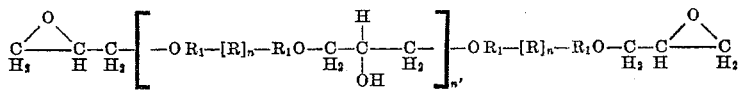

in which R represents a divalent radical selected from the class consisting of ketone residues formed by the elimination of the ketonic oxygen atom and aldehyde residues obtained by the elimination of the aldehydic oxygen atom, the divalent radical

the divalent

radical, the sulfone radical, and the divalent monosulfide radical —S— the divalent radical —CH$_2$SCH$_2$—, and the divalent disulfide radical —S—S—; and R$_1$O is the divalent radical obtained by the elimination of a hydroxyl hydrogen atom and a nuclear hydrogen atom from the phenol

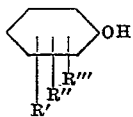

in which R', R", and R'" represent a member of the class consisting of hydrogen and hydrocarbon substituents of the aromatic nucleus, said substituent member having not over 18 carbon atoms; $n$ represents an integer selected from the class of zero and 1, and $n'$ represents a whole number not greater than 3; and (2) cogenerically associated compounds formed in the preparation of (1) preceding, including monoepoxides; said final product being a member of the class consisting of non-thermosetting organic solvent-soluble liquids and low-melting solids; with the final proviso that the reaction product be a member of the class of solvent-soluble liquids and low-melting solids; and said reaction between (ABA) and (C) being conducted below the pyrolytic point of the reactants and the resultants of reaction.

References Cited in the file of this patent
UNITED STATES PATENTS

| | | |
|---|---|---|
| 2,454,541 | Bock et al. | Nov. 23, 1948 |
| 2,454,545 | Bock et al. | Nov. 23, 1948 |
| 2,499,365 | De Groote et al. | Mar. 7, 1950 |
| 2,507,910 | Keiser et al. | May 16, 1950 |
| 2,558,688 | Landa | June 26, 1951 |
| 2,602,052 | De Groote | July 1, 1952 |
| 2,615,853 | Kirkpatrick et al. | Oct. 28, 1952 |